United States Patent
Ko

(10) Patent No.: US 12,179,164 B2
(45) Date of Patent: Dec. 31, 2024

(54) LNG REFORMER SYSTEM

(71) Applicants: Hyundai Motor Company, Seoul (KR); Kia Corporation, Seoul (KR)

(72) Inventor: Dong Seok Ko, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 628 days.

(21) Appl. No.: 17/508,368

(22) Filed: Oct. 22, 2021

(65) Prior Publication Data

US 2022/0331768 A1 Oct. 20, 2022

(30) Foreign Application Priority Data

Apr. 16, 2021 (KR) .................. 10-2021-0049514

(51) Int. Cl.
| | | |
|---|---|---|
| B01J 12/00 | (2006.01) | |
| B01D 53/053 | (2006.01) | |
| C01B 3/48 | (2006.01) | |

(52) U.S. Cl.
CPC .......... B01J 12/005 (2013.01); B01D 53/053 (2013.01); C01B 3/48 (2013.01); B01D 2256/16 (2013.01);
(Continued)

(58) Field of Classification Search
CPC .... B01J 12/00; B01J 12/005; F25J 3/00; F25J 3/02; F25J 3/0228; F25J 3/0266; F25J 3/06; F25J 3/0605; F25J 3/0625; F25J 3/063; F25J 3/0655; F25J 3/067; F25J 2205/00; F25J 2205/40; F25J 2205/60; F25J 2205/64; F25J 2210/00; F25J 2210/62; F25J 2270/00; F25J 2270/90; F25J 2270/904

See application file for complete search history.

(56) References Cited

U.S. PATENT DOCUMENTS

| | | | | |
|---|---|---|---|---|
| 5,000,925 A | * | 3/1991 | Krishnamurthy | ....... C01B 32/50 |
| | | | | 422/234 |
| 8,486,180 B2 | * | 7/2013 | Chen | .................. B01D 53/0473 |
| | | | | 95/98 |

(Continued)

FOREIGN PATENT DOCUMENTS

| | | |
|---|---|---|
| JP | 2018-012635 A | 1/2018 |
| KR | 10-2009-0084844 A | 8/2009 |

*Primary Examiner* — Natasha E Young
(74) *Attorney, Agent, or Firm* — Morgan, Lewis & Bockius LLP

(57) ABSTRACT

LNG reformer system may include a reformer configured for reforming raw material gas including LNG gas and water vapor into hydrogen through a catalytic reaction thereof; a hydrogen PSA extracting the hydrogen in reformed gas produced in the reformer; a CO2 PSA fluidically connected to the hydrogen PSA and configured for extracting carbon dioxide in off-gas discharged from the hydrogen PSA; a first heat exchanger fluidically connected to the CO2 PSA and configured for cooling a fluid including carbon dioxide extracted in the $CO_2$ PSA by LNG supplied from an LNG tank toward the reformer; a CO2 separator fluidically connected to the first heat exchanger and configured for separating the carbon dioxide from a fluid that passed through the first heat exchanger, the fluid including carbon dioxide; and a CO2 tank fluidically connected to the CO2 separator and storing the carbon dioxide separated in the CO2 separator.

15 Claims, 2 Drawing Sheets

(52) U.S. Cl.
CPC .. *B01D 2256/22* (2013.01); *C01B 2203/0283* (2013.01); *C01B 2203/042* (2013.01); *C01B 2203/1241* (2013.01); *C01B 2203/146* (2013.01); *C01B 2203/86* (2013.01)

(56) References Cited

U.S. PATENT DOCUMENTS 9,481,573 B2 11/2016 Vakil et al.
9,938,145 B2 4/2018 Chakravarti et al.

\* cited by examiner

LNG REFORMER SYSTEM

CROSS-REFERENCE TO RELATED APPLICATION

The present application claims priority to Korean Patent Application No. 10-2021-0049514, filed Apr. 16, 2021, the entire contents of which is incorporated herein for all purposes by this reference.

BACKGROUND OF THE INVENTION

Field of the Invention

The present invention relates to a system for reforming liquefied natural gas (LNG) to produce hydrogen.

Description of Related Art

Generation of a large amount of carbon dioxide ($CO_2$) is a problem the method of reforming Liquefied Natural Gas (LNG) to produce hydrogen poses, which leads to a need for technology to properly capture carbon dioxide generated in the reforming process and block release of carbon dioxide into the atmosphere as much as possible, and capturing of carbon dioxide should be done very efficiently.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an LNG reformer system that allows a significant reduction of atmospheric release of carbon dioxide generated in a process of reforming LNG to produce hydrogen, a downsizing of the LNG reformer system, a more efficient operation of the reformer, and production of high purity liquid carbon dioxide to maximize profitability.

To achieve the objects described above, the LNG reformer system according to various exemplary embodiments of the present invention includes a reformer configured for reforming raw material gas including LNG gas and water vapor into hydrogen through a catalytic reaction thereof; a hydrogen PSA extracting the hydrogen in reformed gas produced in the reformer; a CO2 PSA fluidically connected to the hydrogen PSA and configured for extracting carbon dioxide in off-gas discharged from the hydrogen PSA; a first heat exchanger fluidically connected to the CO2 PSA and configured for cooling a fluid including carbon dioxide extracted in the $CO_2$ PSA by the LNG supplied from an LNG tank toward the reformer; a CO2 separator fluidically connected to the first heat exchanger and configured for separating carbon dioxide from the fluid that passed through the first heat exchanger, the fluid including carbon dioxide; and a CO2 tank configured for storing the carbon dioxide separated in the $CO_2$ separator.

An off-gas compressor compressing the off-gas to a predetermined reference pressure to supply the off-gas to the $CO_2$ PSA may be provided between the hydrogen PSA and the $CO_2$ PSA.

The $CO_2$ PSA may be configured to extract carbon dioxide having a purity equal to or greater than a predetermined first reference purity from the off-gas.

The $CO_2$ separator may be configured to separate carbon dioxide having a purity equal to or greater than a second reference purity which is higher than the first reference purity.

A mixer configured for mixing a residue other than the fluid including carbon dioxide extracted in the $CO_2$ PSA and a residue other than carbon dioxide separated in the $CO_2$ separator to supply the mixture to a burner may be provided.

An LNG pump pumping LNG from an LNG tank toward the first heat exchanger; and a heater heating LNG that passed through the first heat exchanger to supply the LNG toward the reformer may be included.

A second heat exchanger that is provided between the heater and the reformer and allows raw material gas, formed by the LNG gas supplied from the heater along with the water vapor, to be heated by exhaust gas of the burner before being supplied to the reformer, may be included, wherein the LNG gas supplied from the heater is supplied to the burner as well.

A converter may be provided between the reformer and the hydrogen PSA so that the carbon monoxide in the reformed gas produced in the reformer is subjected to a conversion reaction with the water vapor to produce the hydrogen.

A fourth heat exchanger provided between the converter and the hydrogen PSA and configured for heating water in a liquid state by the reformed gas delivered from the converter to the hydrogen PSA; and a third heat exchanger configured for heating the water vapor and water that passed through the fourth heat exchanger by the reformed gas delivered from the reformer to the converter may be included, wherein, along with the LNG gas, the water vapor and water that passed through the third heat exchanger may form raw material gas to be supplied to the second heat exchanger.

A fifth heat exchanger may be provided between the fourth heat exchanger and the hydrogen PSA for further cooling of the reformed gas passing in between.

The present invention allows a significant reduction of atmospheric release of carbon dioxide generated in a process of reforming LNG to produce hydrogen, a downsizing of the LNG reformer system, a more efficient operation of the reformer, and production of high purity liquid carbon dioxide to maximize profitability.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
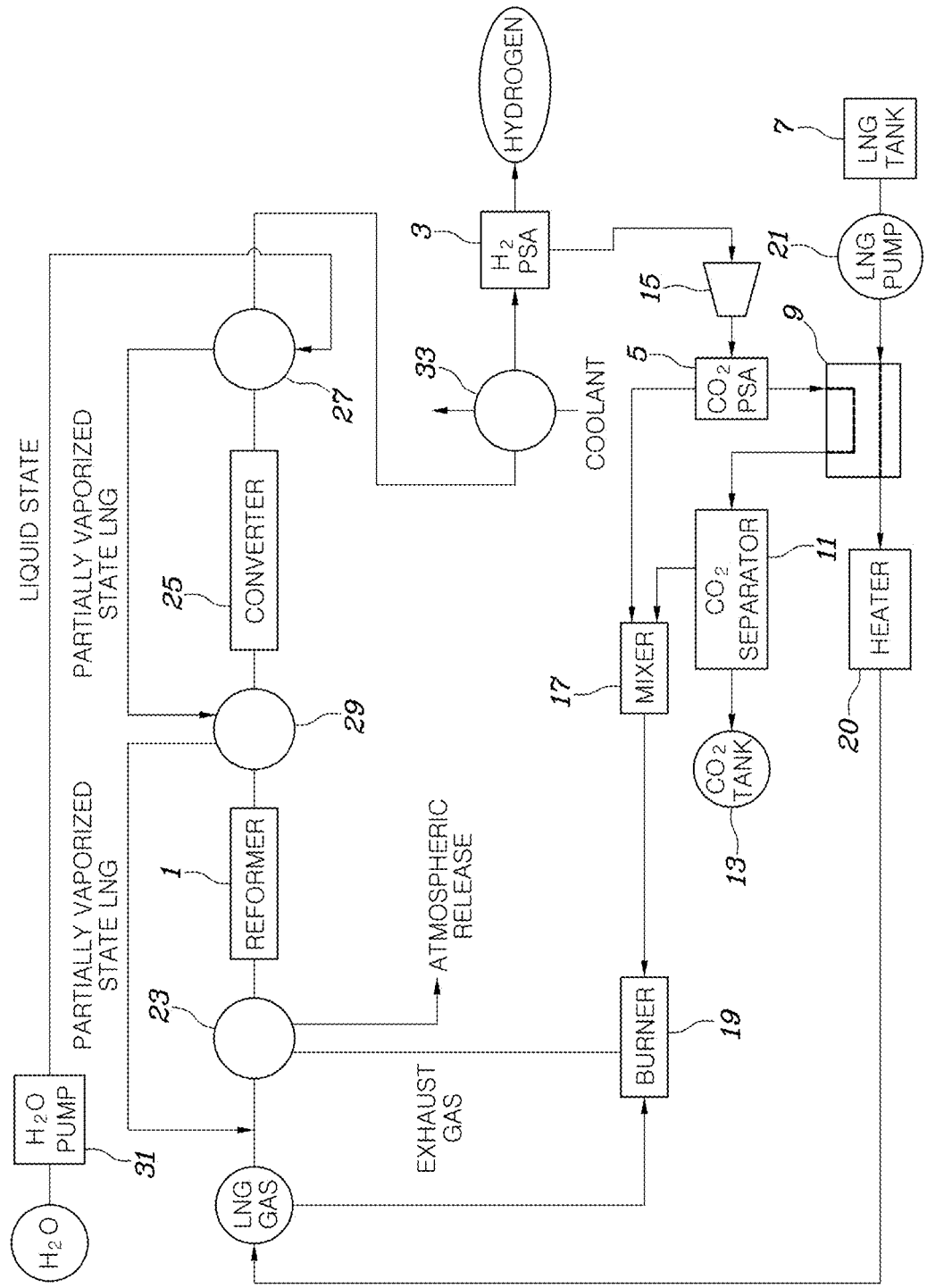
FIG. 1 is a diagram illustrating an exemplary embodiment of an LNG reformer system according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Specific structural or functional descriptions of the exemplary embodiments of the present invention disclosed in the exemplary embodiment or application are presented in way of examples only for the purpose of describing the exemplary embodiments according to various exemplary embodiments of the present invention, and the exemplary embodiments according to various exemplary embodiments of the present invention may be implemented in various forms and should not be construed as being limited to the exemplary embodiments described in the exemplary embodiment or application.

Since the exemplary embodiments according to various exemplary embodiments of the present invention may be modified in various ways and have various forms, specific embodiments will be illustrated in the drawings and described in detail in the exemplary embodiment or application. However, this is not intended to limit the exemplary embodiments according to the concept of the present invention to a specific disclosure form and should be construed as including all modifications, equivalents, and substitutes included in the spirit and technical scope of the present invention.

Terms such as first and/or second may be used to describe various components, but the components should not be limited in the terms. The terms only serve the purpose of distinguishing one component from other components. For example, the first component may be referred to as the second component, and similarly, the second component may also be referred to as the first component without deviating from the scope of the right according to the concept of the present invention.

When a component is referred to as being "connected" or "coupled" to another component, it may be directly connected or coupled to the another component, but it should be understood that other components may exist in between. On the other hand, when a component is referred to as being "directly connected" or "directly coupled" to another component, it should be understood that there is no other component in between. Other expressions describing the relationship between components such as "between" and "just between" or "adjacent to" and "directly adjacent to" should be interpreted in the same manner.

The terms used in the exemplary embodiment are only used to describe specific embodiments and are not intended to limit the present invention. Singular expressions include plural expressions unless the context explicitly indicates otherwise. In the exemplary embodiment, terms such as "comprise" or "have" are intended to designate the presence of implemented features, numbers, steps, actions, components, parts, or combinations thereof and should not be understood to preclude the presence or additional possibilities of one or more of other features, numbers, steps, actions, components, parts or combinations thereof in advance.

Unless otherwise defined, all terms used herein, including technical or scientific terms, have the same meanings as are generally understood in those with common knowledge in the art to which various exemplary embodiments of the present invention belongs. The terms such as those defined in a generally used dictionary should be interpreted as having meanings consistent with the meanings in the context of the related technology and should not be interpreted as an idealistic or excessively formal meaning unless explicitly defined in the exemplary embodiment of the present invention.

Hereinafter, the present invention will be described in detail in describing exemplary embodiments of the present invention with reference to the accompanying drawings. The same reference numerals shown in each drawing indicate the same members.

Figure 2:
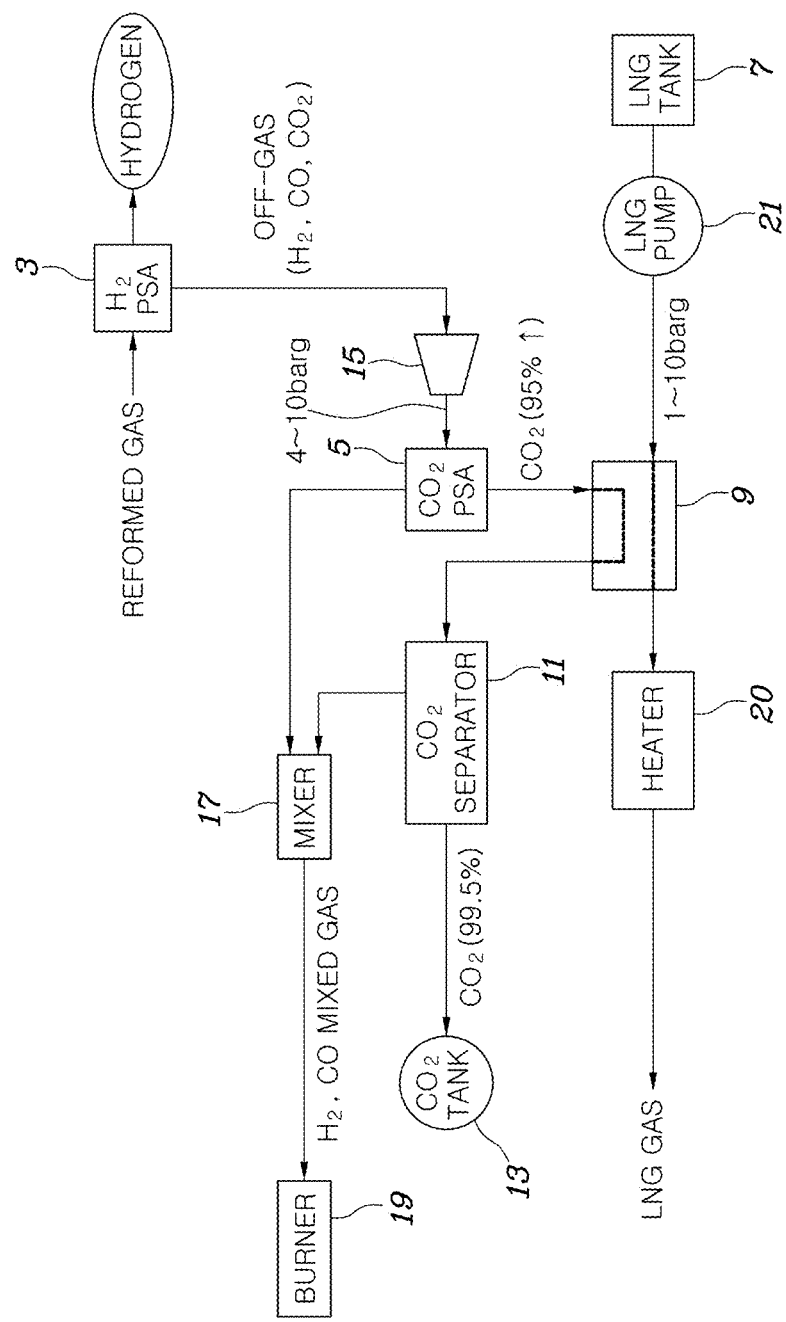
FIG. 2 is a diagram detailing the main part of FIG. 1.

FIG. 1 and FIG. 2 show that an exemplary embodiment of an LNG reformer system according to various exemplary embodiments of the present invention includes a reformer 1 reforming raw material gas including LNG gas and water vapor into hydrogen through a catalytic reaction thereof; a hydrogen PSA 3 extracting hydrogen in reformed gas produced in the reformer 1; a $CO_2$ PSA 5 extracting carbon dioxide in off-gas discharged from the hydrogen PSA 3; a first heat exchanger 9 cooling a fluid including carbon dioxide extracted from the $CO_2$ PSA by LNG supplied from an LNG tank 7 toward the reformer 1; a $CO_2$ separator 11 separating carbon dioxide from the fluid that passed through the first heat exchanger 9, the fluid including carbon dioxide; and a $CO_2$ tank 13 storing carbon dioxide separated in the $CO_2$ separator 11.

Here, the off-gas which is a residue of the reformed gas from which the hydrogen PSA 3 extracts hydrogen includes $H_2$, CO, $CO_2$, etc.

Furthermore, pressure swing adsorption (PSA) used in the expressions of the hydrogen PSA 3 and the $CO_2$ PSA 5 is a term meaning a process technology of removing impurities by adsorption under high pressure to purify a target substance such as hydrogen or $CO_2$ from a mixed gas to high purity, and here, it means a purifying device performing such process technology.

That is, in various exemplary embodiments of the present invention, the carbon dioxide in the off-gas inevitably generated in the reformer 1 reforming LNG to produce hydrogen is extracted in the CO2 PSA, and then, the fluid including the extracted carbon dioxide is cooled while passing through the first heat exchanger 9 and passes through the CO2 separator 11 so that the separated carbon dioxide is stored in the $CO_2$ tank 13 in a liquid state and is not released into the atmosphere.

Therefore, the present invention may significantly reduce atmospheric release of carbon dioxide in a process of producing hydrogen by the LNG reformer system and produce high purity liquid carbon dioxide, which may be expected to generate extra profits.

Furthermore, the first heat exchanger 9 may allow an automatic cooling action by the LNG supplied to the reformer 1 so that cooling of carbon dioxide and heating of LNG may be performed very efficiently.

An off-gas compressor 15 compressing the off-gas to a predetermined reference pressure to supply the off-gas to the $CO_2$ PSA is provided between the hydrogen PSA 3 and $CO_2$ PSA.

Here, the reference pressure is preferably set to 4 to 10 barg (bar gauge) and the LNG reformer system of the present invention may be preferably provided in a hydrogen filling station regulated to operate the system at 10 barg or less.

In this regard, the pumping pressure of an LNG pump 21 to be described below may be preferably set to 1 to 10 barg to satisfy the regulations as described above.

The $CO_2$ PSA 5 is configured to extract carbon dioxide having a purity equal to or greater than a predetermined first reference purity from the off-gas.

Here, the first reference purity may be set to 95% or higher.

That is, since carbon dioxide extracted in the $CO_2$ PSA 5 cannot be liquefied at a pressure of 10 barg or less when the purity is less than 95%, considering the compression pressure of the off-gas compressor 15 as described above, the $CO_2$ PSA should be capable of extracting carbon dioxide having a purity equal to or greater than 95%.

Furthermore, the $CO_2$ separator 11 is configured to separate carbon dioxide having a purity equal to or greater than a second reference purity which is higher than the first reference purity.

Even if the $CO_2$ PSA 5 extracts carbon dioxide from the off-gas as described above, the extracted fluid includes H2, CO, etc. other than the carbon dioxide. Since carbon dioxide has a high purity to generate extra profits using the carbon dioxide extracted as described above, the $CO_2$ separator 11 separates carbon dioxide having a purity equal to or greater than the second reference purity which is higher than the firsts reference purity to transmit the carbon dioxide to the $CO_2$ tank 13.

Therefore, the second reference purity may be set to 99% or higher.

Meanwhile, since a residue other than the fluid including carbon dioxide extracted in the $CO_2$ PSA 5 and a residue other than carbon dioxide separated in the $CO_2$ separator 11 mainly include H2, CO, etc., the exemplary embodiment of the present invention is configured to mix them in a mixer 17 to supply as fuel for a burner 19.

The burner 19 heats the reformer 1 with the heat generated by burning the gas supplied from the mixer 17 as described above.

At the present time, the gas supplied to the burner 19 from the mixer 17 is stripped of carbon dioxide, which allows a smoother operation of the burner 19 and increases efficiency of the reformer 1.

Furthermore, the exemplary embodiment of the present invention includes an LNG pump 21 pumping LNG from an LNG tank 7 toward the first heat exchanger 9 and a heater 20 heating, and supplying toward the reformer 1, the LNG that has passed through the first heat exchanger 9.

Of course, the pumping pressure of the LNG pump 21 is preferably limited to 10 barg or less to be provided in a hydrogen filling station as described above.

By passing through the first heat exchanger 9 while being delivered under pressure toward the reformer 1 by the LNG pump, the LNG in the LNG tank 7 is heated by absorbing heat while cooling the fluid including carbon dioxide extracted in the $CO_2$ PSA and is further heated in the heater 20 to brings the temperature close to room temperature.

In various exemplary embodiments of the present invention, the LNG gas supplied from the heater 20 is mainly supplied to the reformer 1, and when the gas supplied from the mixer 17 alone is insufficient and the burner 19 need more fuel, is supplied to the burner 19 so that the burner 19 may be stably operated.

Furthermore, in various exemplary embodiments of the present invention, along with water vapor, the LNG gas supplied from the heater 20 forms raw material gas, and before supplied to the reformer 1, is heated by the exhaust gas of the burner 19 by passing through the second heat exchanger 23 so that thermal efficiency of the system may improve.

Since the burner 19 is supplied with the gas stripped of most of carbon dioxide included in the off-gas as described above through the mixer 17 and burns it, the amount of exhaust gas discharged from the burner 19 is significantly reduced compared with the state where carbon dioxide is not removed so that the second heat exchanger 23 may be relatively downsized. This contributes to an overall downsizing of the LNG reformer system.

Meanwhile, a converter 25 may be provided between the reformer 1 and the hydrogen PSA 3 so that the carbon monoxide in the reformed gas produced in the reformer 1 is subjected to a conversion reaction with the water vapor to produce the hydrogen.

Furthermore, the exemplary embodiment may include a fourth heat exchanger 27 heating water in a liquid state by the reformed gas delivered from the converter 25 to the hydrogen PSA 3; and a third heat exchanger 29 heating water vapor and water that passed through the fourth heat exchanger 27 by the reformed gas delivered from the reformer 1 to the converter 25.

That is, the water pumped in an $H_2O$ pump 31 is gradually transformed into water vapor while passing through the fourth heat exchanger 27 and the third heat exchanger 29, and along with the LNG gas, the water vapor and water that passed through the third heat exchanger 29 form raw material gas, which is supplied to the second heat exchanger 23 so that the heat required to transform the water into water vapor may be supplied to the second heat exchanger 23, the third heat exchanger 29, and the fourth heat exchanger 27, and there is no need to use an extra heat source.

Meanwhile, a fifth heat exchanger 33 may be provided between the fourth heat exchanger 27 and the hydrogen PSA 3 for further cooling the reformed gas passing in between.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A Liquefied Natural Gas (LNG) reformer system comprising:
   a reformer configured for reforming raw material gas including LNG gas and water vapor into hydrogen through a catalytic reaction thereof;
   a hydrogen pressure swing adsorption (PSA) fluidically connected to the reformer and configured for extracting the hydrogen in reformed gas produced in the reformer;
   a CO2 PSA fluidically connected to the hydrogen PSA and configured for extracting carbon dioxide in off-gas discharged from the hydrogen PSA;
   a first heat exchanger fluidically connected to the CO2 PSA and configured for cooling a fluid including carbon dioxide extracted in the $CO_2$ PSA by LNG supplied from an LNG tank toward the reformer;
   a CO2 separator fluidically connected to the first heat exchanger and configured for separating the carbon dioxide from a fluid that passed through the first heat exchanger; and
   a CO2 tank fluidically connected to the CO2 separator and storing the carbon dioxide separated in the CO2 separator.

2. The LNG reformer system of claim 1, wherein an off-gas compressor compressing the off-gas to a predetermined reference pressure to supply the off-gas to the $CO_2$ PSA is provided between the hydrogen PSA and the CO2 PSA.

3. The LNG reformer system of claim 2, wherein the $CO_2$ PSA is configured to extract carbon dioxide having a purity equal to or greater than a predetermined first reference purity from the off-gas.

4. The LNG reformer system of claim 3, wherein the $CO_2$ separator is configured to separate carbon dioxide having a purity equal to or greater than a second reference purity which is higher than the first reference purity.

5. The LNG reformer system of claim 1, further including a mixer configured for mixing a first residue other than a fluid including carbon dioxide extracted in the CO2 PSA and a second residue other than carbon dioxide separated in the CO2 separator to supply a mixture of the first residue and the second residue to a burner connected to the mixer.

6. The LNG reformer system of claim 5, wherein the mixer is fluidically connected to the $CO_2$ PSA and the $CO_2$ separator in parallel.

7. The LNG reformer system of claim 5, further including:
   an LNG pump fluidically connected to the LNG tank and configured for pumping the LNG from the LNG tank toward the first heat exchanger.

8. The LNG reformer system of claim 5, further including:
   a heater fluidically connected to the LNG tank and configured for heating the LNG that passed through the first heat exchanger to supply the heated LNG toward the reformer.

9. The LNG reformer system of claim 8, further including:
   a second heat exchanger that is provided between the heater and the reformer and allows raw material gas, formed by the LNG gas supplied from the heater along with the water vapor, to be heated by exhaust gas of the burner before being supplied to the reformer, wherein the LNG gas supplied from the heater is supplied to the burner and the second heat exchanger.

10. The LNG reformer system of claim 9, wherein the LNG gas supplied from the heater is heated by the exhaust gas of the burner before supplied to the reformer.

11. The LNG reformer system of claim 9, further including:
   a converter provided between the reformer and the hydrogen PSA so that carbon monoxide in the reformed gas produced in the reformer is subjected to a conversion reaction with the water vapor to produce the hydrogen.

12. The LNG reformer system of claim 11, further including:
   a third heat exchanger provided between the reformer and the converter; and
   a fourth heat exchanger provided between the converter and the hydrogen PSA and configured for heating water in a liquid state by the reformed gas delivered from the converter to the hydrogen PSA,
   wherein the third heat exchanger is configured for heating water vapor and water that passed through the fourth heat exchanger by the reformed gas delivered from the reformer to the converter.

13. The LNG reformer system of claim 12,
   wherein, along with LNG gas, the water vapor and the water that passed through the third heat exchanger form the raw material gas to be supplied to the second heat exchanger.

14. The LNG reformer system of claim 13, further including:
   an $H_2O$ pump fluidically connected to the fourth heat exchanger and the third heat exchanger to supply the water vapor and the water that passed through the third heat exchanger to the second heat exchanger.

15. The LNG reformer system of claim 12, including:
   a fifth heat exchanger provided between the fourth heat exchanger and the hydrogen PSA for further cooling reformed gas passing in between the fourth heat exchanger and the hydrogen PSA.

* * * * *